May 17, 1927.
E. H. RYON
GAS BURNER CONTROL
Filed May 8, 1925
1,629,228
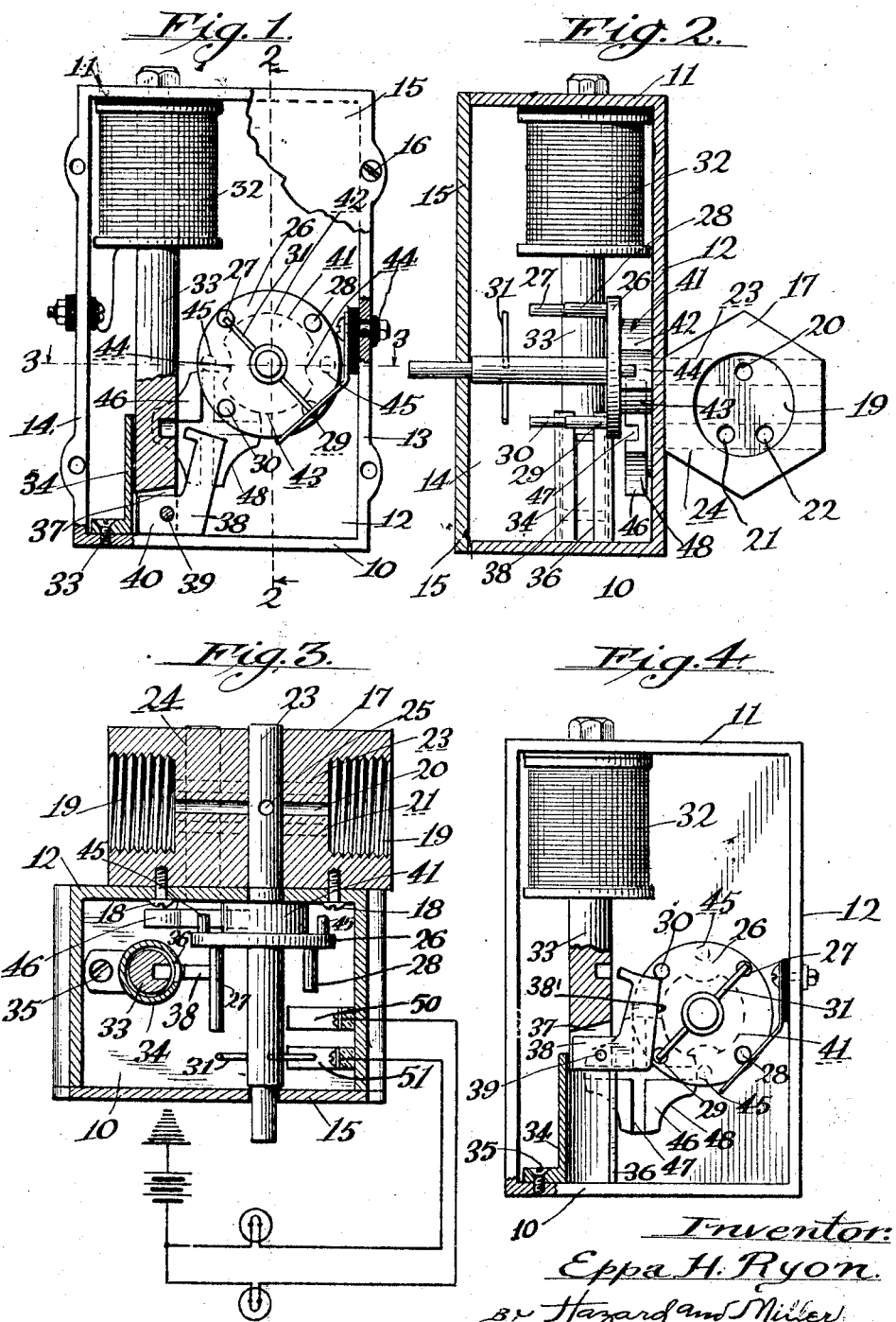
Inventor:
Eppa H. Ryon
by Hazard and Miller
Attorneys Patented May 17, 1927.

1,629,228

UNITED STATES PATENT OFFICE.

EPPA H. RYON, OF PASADENA, CALIFORNIA.

GAS-BURNER CONTROL.

Application filed May 8, 1925. Serial No. 28,947.

This invention relates to improvements in gas burner controls.

An object of this invention is to provide a device for controlling the flow of gas in a pipe or conduit to a gas burner, which can be remotely controlled.

Another object of this invention is to provide a device for controlling the flow of fuel or gas to a burner, which is of simple construction and which is so arranged that a low, intermediate or high fire can be regulated by means of the remote control which consists of a single switch.

A further object of the invention is to provide means associated with the valve or burner control for indicating which of the three possible degrees of fire is burning at the remotely located switch.

With the foregoing and other objects in view which will be made manifest in the following detailed description and specifically pointed out in the appended claims, reference is had to the accompanying drawings for an illustrative embodiment of the invention, wherein:

Figure 1 is a side elevation of the improved gas burner control, the cover being shown as broken away and removed, Fig. 2 is a vertical section taken substantially on the line 2—2 of Fig. 1, Fig. 3 is a horizontal section taken substantially on the line 3—3 of Fig. 1, and Fig. 4 is a view similar to Fig. 1, the device being shown as having been actuated so as to produce a low fire, whereas Fig. 1 shows the device in completely closed position.

Referring to the accompanying drawings wherein similar reference characters designate similar parts throughout, the device is illustrated as having a box-like casing having a bottom 10, a top 11, a back 12 and side walls 13 and 14. A cover 15 constituting the front wall is removably secured upon the casing as by screws 16. Upon the back of the casing there is mounted a valve body 17 secured upon the back as by screws 18. This valve body has recesses 19 formed in its ends which are interiorly threaded so that the valve body may be connected to the adjacent ends of pipe sections forming a gas line or other fluid line.

Three bores 20, 21 and 22 are formed in the valve body 17 and these bores are parallel to each other. The bores 21 and 22 are in the same horizontal plane, whereas the bore 20 is in a plane above the plane containing the bores 21 and 22. Two stems 23 and 24 have their forward ends disposed within the casing and extend through the back 12 and into the valve body 17. The stem 23 extends through the bore 20 and has an aperture formed therein, as indicated at 25, which upon rotation of the stem 23 is adapted to be brought into register with the bore 20, permitting gas to flow in the gas line through the bore 20. The stem 24 is also rotatable in the valve body 17 and has two apertures formed therein which are adapted to be brought into register with the bores 21 and 22. In this manner the stem 24 also provides means for opening and closing the gas line. It will be understood that if the bores 21 and 22 are closed, and the bore 20 is open, a small amount of gas will be allowed to flow in the gas line. If the bore 20 is closed and the bores 21 and 22 are open, a larger amount of gas will be allowed to flow in the gas line; and in such position, there will be produced an intermediate fire. When all of the bores are open, the maximum amount of gas will be allowed to flow, poducing a high fire.

The stem 23 carries an annular plate 26 thereon, which plate is disposed within the casing. The plate is shown as slightly spaced from the back 12 and has four studs indicated at 27, 28, 29 and 30 projecting forwardly therefrom. The studs 28 and 29 are preferably the same length and are somewhat shorter than the studs 27 and 30 for a purpose hereinafter to be described. These studs are arranged adjacent the edge of the plate 26 and are angularly disposed 90 deg. apart. They serve to provide projections carried by the stem 23. A pin 31 extends diametrically through the stem 23 and this pin is arranged forwardly of the forward ends of the long studs 27 and 30. This pin serves to provide diametrically opposed contacts upon the stem 23 for a purpose hereinafter to be described.

I provide means for rotating the stem 23 so as to open and close the bore 20, which means is operable at a location remotely situated from the gas burner control. This means consists of a solenoid 32 which is disposed within the container or casing adjacent its upper corner. Suitable wires are connected to the solenoid 32 through a source of current and to a remotely located switch, not shown. A core 33 has its upper end slidable within the solenoid 32 and serves as an armature adapted to be attracted by the solenoid. The lower end of the core 33 is slidable in a sleeve 34 which is secured as by screws 35 to the bottom 10 of the casing. The sleeve 34 has a slot 36 formed therein. The bottom of the core 33 has a slot 37 in which is pivoted a pawl 38 as upon a pin 39.

The operation of the means for rotating the stem 23 is as follows: When the remotely located switch is closed, establishing an electric circuit through the solenoid 32, the solenoid will become energized and lift the core or armature 33. The upper end of the pawl 38 engages the stud 30 and moves or rotates the stem 23 from the position shown in Fig. 1 to the position shown in Fig. 4, thus rotating the stem from closed position, as shown in Fig. 1, to open position, as shown in Fig. 4. The remotely located switch may be in the form of a button or the like and when it is allowed to open so as to break the circuit through the solenoid 32, the core or armature 33 will fall under gravity, the pawl 38 swinging against the side of the core 33 as it slides over the stud 29, which has been brought into the position previously occupied by the stud 30. It will be noted that the bottom edge of the pawl 38 is flush with the bottom of the core 33 when the pawl is in the position shown in Fig. 1. When the pawl 38 is swung against the side of the core 33, the corner 40 projects slightly below the bottom of the core 33, and as the core 33 strikes the bottom 10 of the casing, the pawl 38 will be forcibly thrown from the side of the core 33 into the position shown in Fig. 1.

From an inspection of Fig. 4, it will be appreciated that when the core 33 is in its uppermost position, the stud 29 engages the side edge 38' of the pawl 38 so that the pawl serves as a stop, limiting the rotation of the stem 23 to a quarter of a revolution upon each movement of the armature 33. The pawl 38 is slidable in the slot 36 formed in the sleeve 34 and in this manner rotation of the core 33 is prevented. It will be understood that every time the switch is closed so as to energize the solenoid 32, the core 33 will be lifted and the pawl 38 will engage whichever stud upon the plate 26 is in the position occupied by the stud 30 in Fig. 1. In this manner the stem 23 is rotated a quarter of a revolution every time that the switch is closed.

The above described means produces rotation of the stem 23 so as to open and close the bore 20, which provides the low fire in the burner. The means for rotating the stem 24 is as follows: Between the plate 26 and the back 12 of the casing, a type of cam shaped member 41 is formed upon the stem 23. This cam shaped member is in the form of two opposed projections 42 and 43, which have exterior cylindrical surfaces. Notches 44 define the projections 42 and 43 and are arranged diametrically opposite each other. Studs 45 project rearwardly from the plate 26 opposite the notches 44. Upon the forward end of the stem 24 there is mounted a type of Geneva gear, which consists of a plate-like body 46, which is disposed behind the plate 26 and which has two diametrical grooves 47 formed in its forward face. The plate-like body 46 is cruciform in plan, and simulates a Geneva cross so that the plate 46 can be properly termed a Geneva gear. The stem 24 with the Geneva gear 46 are so arranged that the cylindrical surfaces 48 formed upon the periphery of the body 46 are complementary to the cylindrical surfaces provided upon the projections 42 and 43. The studs 45 are so arranged upon the back side of the plate 26 as to enter any of the grooves 47. When the stem 23 is rotated but a quarter of a revolution from the closed position shown in Fig. 1 to the open position shown in Fig. 4, the stud 45 will have rotated 90 deg. and will be opposite the right hand end of the horizontal groove 47 upon the plate 46. During the next quarter revolution which swings the stem 23 from the position shown in Fig. 4 to a closed position, which position will be after the stem 23 has rotated 180 deg. from the position shown in Fig. 1, the stud 45 enters the groove 47 and swings the stem 24 and the plate 46 through a quarter of a revolution. During the next quarter revolution of the stem 23, the stem 24 will not be rotated, but will be kept stationary because of the engagement between the cylindrical surfaces 48 and the cylindrical surfaces provided upon the exterior of the cam 41. During the following quarter revolution of the stem 23, the stem 24 will again be rotated a quarter of a revolution, and in this manner it will be appreciated that the stem 24 rotates one quarter of a revolution during every alternate quarter revolution of the stem 23.

The cycle of events for the two stems 23 and 24 is therefore as follows: Starting in the position shown in Fig. 1, in which all of the bores 20, 21 and 22 are closed, the first quarter revolution of the stem 23 opens the bore 20, the stem 24 remaining stationary during this movement. During the second quarter revolution of the stem 23, the bore 20 will be closed again and the stem 24 rotated a quarter of a revolution to open the bores 21 and 22. In this manner the amount of gas flowing in the gas line after the stem 23 has been twice rotated a quarter of a revolution will be twice as great as when the bore 20 is open, thus providing an intermediate fire. During the third quarter revolution of the stem 23, the stem 24 remains stationary, leaving the bores 21 and 22 open, and the stem 23 will be rotated in such a position as to open the bore 20. In this position all of the bores are open and a high fire is produced. During the fourth revolution the stems 23 and 24 are both rotated 90 deg. and all the bores are closed. In this manner a low, intermediate and high fires can be produced by closing the remotely located switch the required number of times.

In a gas control of this kind, it is necessary to provide some kind of means for indicating the position of the stems 23 and 24 so that it may be determined whether a low or intermediate or high fire is burning. Within the side wall 13 of the casing there are mounted two resilient contacts indicated at 50 and 51. The contact 50 is so arranged as to clear the short studs 28 and 29 upon the plate 26, but will engage the ends of the long studs 27 and 30. The contact 51 is arranged forwardly of the contact 50 and is adapted to be engaged by the ends of the pin 31. The long studs 27 and 30 provide two contacts upon the stem 23 which are 90 deg. apart and which are adapted to engage the contact 50. The pin 31 provides two contacts upon the stem 23 which are 180 deg. apart and which are adapted to engage the contact 51. A light is connected in series with each contact 50 and 51. These lights are mounted adjacent the remotely located switch and are connected through a suitable source of current to the casing which serves as a ground as shown in Fig. 3. By tracing out the cycle of events, it will be appreciated that in the position shown in Fig. 1, neither of the contacts 50 or 51 are engaged and the lights will therefore not burn, indicating that no gas is turned on. In the position shown in Fig. 4, one end of the pin 31 is engaging the contact 51, so that one light is burning, which light is designated so as to indicate that the bore 20 is open. After the second quarter of a revolution has been made, this end of the pin 31 will disengage the contact 51 and the stud 27 will engage the contact 50, causing the other light to be illuminated, indicating that the bores 21 and 22 are open and that an intermediate fire is burning. After the third quarter revolution, the stud 30 and that end of the pin 31 which is above it will have been rotated so that both of the contacts 50 and 51 will be engaged, thus causing both of the lights to burn simultaneously, indicating that all of the bores are open and that a high fire is burning.

From the above it will be appreciated that an improved gas burner control is provided which can be remotely operated and which has indicating means for indicating the kind of fire burning. The device is so constructed as to be simple in operation, having a comparatively few moving parts and which will not get out of order. By mounting the pawl 38 directly upon the core 33, some of the parts employed in prior constructions are eliminated. It will be understood that the exact construction shown does not necessarily have to be employed. For example, the projections upon the stem 23 afforded by the studs 27, 28, 29 and 30 can be provided in other manners, if desirable. By arranging the valve body 17 in a horizontal position across the back 12, the device can be mounted upon any horizontal portion of a gas line and rotated in such a position that the core 33 is vertically disposed and the solenoid 32 is arranged above it, so that the core 33 will be gravity retracted into its initial position when the solenoid 32 is de-energized. If found desirable, springs can be employed for returning the core 33 into its initial position and the device may be so arranged as to be in a horizontal position.

It will be understood that it is not necessary to employ both of the stems 23 and 24, as the stem 23 can be used in connection with solenoid 32, the slidable core 33 and the pawl 38, without employing the stem 24. In other words, the stem 23 can be used alone with the actuating mechanism which rotates it one quarter of a revolution at a time.

It will also be understood that the stems 23 and 24 can be used in conjunction with each other without employing the specific actuating mechanism as shown for rotating the stem 23 one quarter of a revolution at a time.

It will be understood that various changes may be made in the detail of construction without departing from the spirit or scope of the invention as defined by the appended claims.

I claim:

1. A gas burner control comprising a solenoid, a core slidable within the solenoid adapted to be attracted thereby, a stem having an aperture therethrough rotatably disposed in a gas line, means providing projections upon the stem, and a pawl carried by said core capable of engaging one of said projections when the solenoid is energized to rotate said stem a predetermined amount, said pawl having a flat side so arranged as to be engaged by a succeeding projection upon the stem so as to serve as a stop for the stem.

2. A gas burner control comprising a solenoid, a core having one end slidable within said solenoid, a sleeve having a slot formed therein in which the other end of the core is slidable, a pawl pivoted to the core and slidable within the slot in said sleeve, and a stem having an aperture therein rotatably disposed in a gas line adapted to open and close the gas line upon rotation, said stem carrying projections engageable by said pawl whereby when the solenoid is energized, said core will be attracted, causing said pawl to engage one of the projections and rotate said stem a predetermined amount.

3. A gas burner control comprising a solenoid, a core having one end slidable within said solenoid, a sleeve having a slot formed therein in which the other end of the core is slidable, a pawl pivoted to the core and slidable within the slot in said sleeve, and a stem having an aperture therein rotatably disposed in a gas line adapted to open and close the gas line upon rotation, said stem carrying projections engageable by said pawl whereby when the solenoid is energized, said core will be attracted, causing said pawl to engage one of the projections and rotate said stem a predetermined amount, said core being so arranged as to be retracted by gravity into its initial position.

4. In a fluid line, a pair of stems having apertures therethrough rotatably disposed in the line so as to open and close the line upon rotation, means for rotating one stem a quarter of a revolution at a time, and means connecting said stems whereby the other stem will be rotated one quarter revolution only during alternate quarter revolutions of the first stem.

5. In a fluid line, a pair of stems having apertures therethrough rotatably disposed in the line so as to open and close the line upon rotation, means for rotating one stem a quarter of a revolution at a time, means connecting said stems whereby the other stem will be rotated one quarter revolution only during alternate quarter revolutions of the first stem, a pair of diametrically opposed contacts upon the first stem, a stationary contact capable of being engaged by said contacts, a second pair of contacts mounted upon the first stem 90 deg. apart, and a second stationary contact adapted to be engaged by the second pair of contacts as and for the purpose described.

6. In a fluid line, a pair of stems having apertures therethrough rotatably disposed within the line adapted to open and close the line upon rotation, means for rotating one stem a quarter revolution at a time, and means including a Geneva gear connecting said stems whereby the other stem will be rotated a quarter revolution by the first stem only during alternate quarter revolutions of the first stem.

7. In a fluid line, a pair of stems having passages therethrough rotatably disposed within the line, means for rotating one stem, and means connecting the mentioned stem to the other stem whereby when the mentioned stem has been rotated one complete revolution the other stem will have been rotated thereby only a part of a revolution.

8. In a fluid line, a pair of stems having passages therethrough rotatably disposed within the line, means for rotating one stem, and means connecting the mentioned stem to the other stem, whereby when the mentioned stem has been rotated one-half a revolution, the other stem will have been rotated thereby one-quarter of a revolution.

9. A gas burner control comprising a valve adapted to be mounted in a gas line, electro-magnetic means adapted to open and close said valve, and a second valve operable by said means so as to be actuated only during alternate actuations of the first mentioned valve.

10. A gas burner control comprising a solenoid, a core adapted to be attracted by the solenoid, a stem having a passage therethrough rotatably disposed in a gas line, means providing projections upon said stem, a pawl carried by the core engageable upon said projections whereby when the core is actuated by said solenoid, it may produce rotation of said stem, and a second stem having a passage therethrough rotatably mounted in the gas line, said second stem being so connected to the first stem as to be rotated only during alternate actuations of said core.

11. A gas burner control comprising a solenoid, a core adapted to be actuated by said solenoid, a stem having a passage therethrough rotatably mounted in a gas line, means providing an annular flange upon said stem, pins projecting from a side face of said flange, a pawl pivoted upon said core adapted to engage said pins in producing rotation of said stem whenever the core is actuated by said solenoid, a second stem having a plurality of apertures therein rotatably mounted in the gas line, and means connecting said second stem to said first stem whereby the second stem will rotate only during alternate actuations of the core.

12. In a fluid line, a stem adapted upon rotation to open and close the line, means providing projections upon said stem, a solenoid, a core adapted to be attracted by the solenoid, a pivoted pawl having a flat edge adjacent the pivot point upon the core adapted to engage a projection and partially rotate the stem when the solenoid is energized, said pawl being adapted to swing relatively to the core when the core is returning to its initial position, and means engageable upon the flat edge of said pawl when the core reaches its initial position for forcibly moving the pawl into its initial position with respect to the core.

13. In a fluid line, a stem adapted upon rotation to open and close the line, means providing projections upon the stem, a solenoid, a core adapted to be attracted by the solenoid when the solenoid is energized and returned to its initial position by gravity, a pivoted pawl having a flat edge adjacent the pivot point upon the core adapted to engage a projection when the core is attracted so as to partially rotate the stem, said pawl being adapted to swing relatively to the core when the core is returning to its initial position, and a stationary part engageable by the flat edge of said pawl during the return movement of the core for forcibly returning it into its initial position with respect to the core.

14. In a fluid line, a stem adapted upon rotation to open and close the line, means providing projections upon the stem, a solenoid, a core having one end slidable into the solenoid and adapted to be attracted thereby when the solenoid is energized, a pivoted pawl having a flat edge adjacent the pivot point adjacent the other end of the core adapted to engage a projection and partially rotate the stem when the core is attracted, a stationary part engageable by the core to limit its return movement into its initial position, a finger carried by the pawl also engageable upon said part to forcibly move the flat edge of said pawl into its initial position with respect to the core at the end of the return movement of the core, and a stationary part engageable by the flat edge of said pawl as and for the purpose specified.

15. In a fluid line, a stem adapted upon rotation to open and close the line, means providing projections upon the stem, a solenoid, a core adapted to be attracted by the solenoid, a pawl having a flat edge carried by the core engageable upon a projection when the core is attracted to partially rotate the stem, means providing a stationary guide for the core which is located remotely from the solenoid and which prevents rotation of the core, and a stationary surface engageable by the flat edge of said pawl during the return movement of the core for forcibly returning it into its initial position with respect to the core.

16. In a fluid line, a stem adapted upon rotation to open and close the line, a casing into which the stem extends, means providing projections upon the stem within the casing, a solenoid mounted within the casing adjacent one end thereof, a core disposed within the casing adapted to be attracted by the solenoid when the solenoid is energized, a pawl having a flat edge carried by the core engageable upon a projection when the core is attracted to partially rotate the stem, means providing a stationary guide within the casing remote from the solenoid for preventing rotation of said core, and a stationary flat surface engageable upon the flat edge of said pawl during its return movement to rock the pawl into its initial position.

17. In a fluid line, a stem adapted upon rotation to open and close the line, a casing into which the stem extends, means providing projections upon the stem within the casing, a solenoid mounted within the casing adjacent one end thereof, a core disposed within the casing adapted to be attracted by the solenoid when the solenoid is energized, a pawl having a flat edge carried by the core engageable upon a projection when the core is attracted to partially rotate the stem, means providing a stationary guide within the casing adjacent the end of the casing opposite the solenoid for guiding the core, and a flat surface engageable with the flat edge of said pawl during its return movement to rock the same into its initial position.

In testimony whereof I have signed my name to this specification.

EPPA H. RYON.